United States Patent [19]

Garrigue et al.

[11] Patent Number: 4,957,999

[45] Date of Patent: Sep. 18, 1990

[54] PROCESS FOR CURING AMINOPLAST RESINS

[75] Inventors: Roger Garrigue; Jack Lalo, both of Toulouse; Andre Vignau, Muret, all of France

[73] Assignee: Norsolor S.A., Paris, France

[21] Appl. No.: 361,085

[22] Filed: Jun. 5, 1989

[30] Foreign Application Priority Data

Jun. 3, 1988 [FR] France ................................ 8807422

[51] Int. Cl.$^5$ ............................................ C08G 12/32
[52] U.S. Cl. ..................... 528/230; 528/243; 528/254; 528/256; 525/398; 524/593; 428/481; 427/207.1; 427/212
[58] Field of Search ............... 528/230, 243, 254, 256; 529/398; 524/593; 425/481; 427/207.1, 212

[56] References Cited

U.S. PATENT DOCUMENTS 4,085,075  4/1978  Gibbons et al.
4,777,213  10/1988  Kanda et al. ..................... 525/114

FOREIGN PATENT DOCUMENTS 377424   11/1931  Belgium .
1653334  3/1967   Fed. Rep. of Germany .
294027   1/1954   Switzerland .

OTHER PUBLICATIONS

Patent Abstracts of Japan, vol. 7, No. 201 (C-184) (1346), 9-6-83, "Preparation of Solid Urea Resin", 58-101144 (A).

*Primary Examiner*—Morton Foelak
*Assistant Examiner*—Sam A. Acquah
*Attorney, Agent, or Firm*—Millen, WHite & Zelano

[57] ABSTRACT

A process for curing aminoplast resins using a catalyst comprising a hexamethylenetetramine salt of a strong acid, resins produced according to the process, and the use of such resins in the manufacture of particle boards.

20 Claims, No Drawings

PROCESS FOR CURING AMINOPLAST RESINS

BACKGROUND OF THE INVENTION

The present invention relates to a process for curing aminoplast resins, and more particularly to a process for curing urea-formaldehyde resins and urea-formaldehyde resins containing melamine.

Aminoplast resins, in particularly urea-formaldehyde resins are products which are well known in the wood industry. They are manufactured by various processes which involve condensing urea and formaldehyde under various conditions. For wood bonding, particularly in the case of the manufacture of agglomerated particle boards, a curing catalyst is added to these resins. The use of a mixture of this kind which is adhesive when heated and under pressure makes it possible to manufacture particle boards in the presence of wood chips. The curing catalysts employed in most cases are generally ammonium salts such as sulphate, phosphate and lactate, and in most cases, ammonium chloride.

The problems to be solved in the use of these catalysts for curing of aminonoplast resins are incompatible. If reactive catalysts are used, the production efficiency of the board manufacturing line is increased, but with the risk of curing the resin when cold. On the other hand, if it is desired not to run the risk of curing the resin when cold, a relatively unreactive catalyst will be chosen with the resin; the use of such results in a decrease in the efficiency of the production lime, since the resin will cure slowly when heated. It can be seen, therefore, that a compromise must be arrived at so as to made it possible to solve both the problem of the resin curing and that of the line production efficiency. To solve these problems it is necessary to have available catalyst which have a sufficient reactivity gap when heated and when cold.

There is therefore an appreciable need to develop a process for curing aminoplast resins making it possible simultaneously not to cure the resin prematurely, while retaining the possibility of curing the resin when the adhesive coated wood particles or wood plies are placed in a press and heated.

SUMMARY OF THE INVENTION

The present invention relates to a process for curing aminoplast resins with the aid of a curing catalyst which comprises a hexamethylenetetramine salt of a strong acid, and a cured resin produced by such a process. This invention also relates to particle board produced by the use of the curing process of this invention.

According to another aspect of this invention a process is provided for the manufacture of a hexamethylenetetramine salt of a strong acid at the time of use in the aminoplast resin. In particular, hexamethylenetetramine can be incorporated beforehand into the aminoplast resin and the strong acid can then be added at the time of the application.

According to another aspect of this invention, it is possible to add, to the aminoplast resin already containing the hexamethylenetetramine salt of a strong acid, an additional quantity of a strong acid or of hexamethylenetetramine so as to exceed the stoichiometric quantities of strong acid and of hexamethylenetetramine.

Upon further study of the specification and appended claims, further aspects and advantages of this invention will become apparent to those skilled in the art.

It has been found, through the use of a hexamethylenetetramine salt of a strong acid for curing aminoplast resins that it is possible both to gain complete control of the cold curing of aminoplast resins while retaining the potential for hot curing the aminoplast resins. Furthermore, the use of such a catalytic system results in finished products, e.g. particle or plywood boards which exhibit good mechanical characteristics under a wide variety of application conditions.

The process of the present invention comprises the curing of aminoplast resins with the aid of a catalyst comprising a hexamethylenetetramine salt of a strong acid. The hexamethylenetetramine salts of strong acids are manufactured in a manner known in the art, e.g., from an aqueous ammonia solution and from an aqueous solution of formaldehyde, the formaldehyde and the aqueous ammonia being employed in a formaldehyde/($NH_3$) molar ratio of about 1.5. The formaldehyde solution is added hot to the aqueous ammonia solution by being poured in. At the end of the reaction, the solution which has a strongly basic pH is acidified by the addition of a strong acid in such quantity that the pH of the final solution is about 1 to 7, and preferably 2 to 5. According to the invention the acid is chosen from any known inorganic or organic strong acid. Hydrochloric and sulfuric acid are nonlimiting examples of preferred strong acids. The hexamethylenetetramine salt of a strong acid can be prepared at the time of use and can be added to the aminoplast resin. Hexamethylenetetramine can also be added to the aminoplast resin and the strong acid can be added at the time of application. It is also possible to add to the aminoplast resin already containing the hexamethylenetetramine salt of a strong acid an additional quantity of hexamethylenetetramine or an additional amount of a strong acid. Whatever the operating procedure employed, the final quantities of hexamethylenetetramine, of formaldehyde and of the acid correspond to those indicated above. Curing is generally carried out, e.g., at temperatures of 140–200° C.

The quantity of hexamethylenetetramine salt of a strong acid used in the aminoplast resin is about 0.1 to 10% by weight relative to the weight of the resin solution. The aminoplast resin employed are known resins employed, e.g. in the wood industry. More particularly, when the urea-formaldehyde resins which contain melamine are used, these are manufactured in a manner known in the art by condensing urea, formaldehyde and melamine in formaldehyde/$NH_2$ ratios of about 0.4 to 1, the quantity of melamine in these resins being about 0.1 to 10% by weight relative to the weight of the resin.

Without further elaboration, it is believed that one skilled in the art can, using the preceding description, utilize the present invention to the fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application French Number No. 88 07422, are hereby incorporated by reference.

EXAMPLES

Example 1

(a) Preparation of a solution of hexamethylenetetramine hydrochloride.

The following device is employed for the manufacture of this compound:
 a first reactor fitted with a stirrer and a thermometer,
 a second reactor above the first reactor, the second reactor being fitted with a jacket.

590 grams of a 15.35% strength aqueous ammonia solution (5.33 moles) are introduced into the bottom reactor. Into the top reactor are introduced 354 grams of a 67.8% strength aqueous solution of formaldehyde (8 moles), which are kept at 85° C. by circulating hot water in the jacket.

The formaldehyde solution is run into the ammonia solution over 30 minutes: this addition causes an exothermic reaction. The reaction mixture is cooled to 55° C. At the end of reaction the pH is 10.1. 140 grams of a 35% strength solution of hydrochloric acid are then added over 10 minutes so that the pH of the solution is equal to 3.7. The final solution obtained contains 20% of hexamethylenetetramine hydrochloride.

(b) Use of the hexamethylenetetramine hydrochloride solution

To illustrate the difference in the behaviour of hexamethylenetetramine hydrochloride and of a conventional catalyst consisting of ammonium chloride, with ureaformaldehyde resins, the gel times of a urea-formaldehyde resin have been determined at various temperatures.

Into a first test tube are introduced 10 grams of a urea-formaldehyde resin with a molar ratio F/U of 1.3, and 1 cm$^3$ of an aqueous solution of ammonium chloride at a mass concentration of 15%.

Into a second test tube are introduced 10 grams of the safe urea-formaldehyde resin and 1.57 grams of an aqueous solution containing 0.495 g of hexamethylenetetramine hydrochloride and 1.076 grams of water. In both cases the molar quantity of hexamethylenetetramine hydrochloride is equivalent to the molar quantity of ammonium chloride.

The test tubes are immersed in a bath of hot oil. Table 1 shows the gel time at various temperatures.

TABLE 1

| Temperature °C. | Gel times at various temperatures (seconds) | | | |
|---|---|---|---|---|
| | 80 | 100 | 120 | 140 |
| Oil bath | | | | |
| Catalyst 1 | 175 | 130 | 80 | 60 |
| Catalyst 2 | 565 | 245 | 150 | 120 |

Catalyst 1: Ammonium chloride solution
Catalyst 2: Hexamethylenetetramine hydrochloride solution.

Example 2

Three series of particle boards were manufactured under the following conditions:

(A) Normal conditions: solids adhesive mixture at a concentration of 52%.

(B) Thermal treatment of the adhesive-coated chips according to which the adhesive-coated chips are placed in a plastic bag which is shaped in an oven at 60° C. for 75 minutes; a treatment of this kind is intended to simulate the phenomenon of precuring of the resin.

(C) Dilution of the adhesive mixture at a concentration of 46% so as to delay the cure by diluting the adhesive mixture. A urea-formaldehyde resin which exhibits the following characteristics was used for each series:
 F/U = 1.07
 Solids : 64.4%
 Viscosity : 360 mPa s
 Gel time at 80° C. : 155 seconds
 Resin content : 7% resin solids/dry chips The catalyst used for each series was: hexamethylenetetramine hydrochloride employed according to the process of the invention (catalyst 1 in Table 2) known catalysts, namely: (quantities expressed in moles)
 ammonium chloride=(1) (catalyst 2 in Table 2),
 ammonium chloride=(1)+½ hexamethylenetetramine (catalyst 3 in Table 2),
 ammonium chloride=(1)+1 hexamethylenetetramine (catalyst 4 in Table 2),
 ammonium chloride=(1)+1.5 hexamethylenetetramine (catalyst 5 in Table 2).

In each case the quantity of catalyst used is such that there is available one molar equivalent of hydrochloric acid of the NH$_4$Cl system containing 1.5% of dry ammonium chloride relative to the weight of the dry resin.

Particle boards are prepared with all these catalyst systems using the following conditions:
Concentration of the adhesive mixture: (52% (for tests A), 46% (for tests C).
Prepressing: 1 minute—pressure: 5 daN/cm$^2$

| Cure = | Temperature: | 180° C. |
|---|---|---|
| | Pressure: | 25 daN/cm$^2$ |
| | Time: | 4 minutes |

Table 2 summarizes the characteristics of the boards obtained in the various tests.

It is found that the resin cured according to the catalyst used according to the process of the invention makes it possible to manufacture particle boards exhibiting good characteristics (Test 1), be it under conditions of precuring of the resin or under cure limiting conditions.

Example 3

Example 2 is repeated, using the following catalysts:
catalyst 1: hexamethylenetetramine hydrochloride
catalyst 2: ammonium chloride
catalyst 4: ammonium chloride+1 hexamethylene-tetramine Particle boards are manufactured while the cure times are varied. Table 3 summarizes the operating conditions and the characteristics of the boards obtained.

The measurements were performed according to the following standards:
Swelling (%) : NFB 51252
Tensile V 20 : NFB 51250
Formaldehyde content : EN Standard 120 (perforator)

TABLE 2

| Hardeners | 1 | | | 2 | | | 3 | | | 4 | | | 5 | | |
|---|---|---|---|---|---|---|---|---|---|---|---|---|---|---|---|
| Test type | A | B | C | A | B | C | A | B | C | A | B | C | A | B | C |
| Swellings: 24 hours cold water % | 15.2 | 14.3 | 13.2 | 14.3 | 21 | 12.2 | 13.9 | 14.8 | 13.4 | 15.8 | 14 | 16 | 18.5 | 17.5 | |
| Tensile N/mm² for a density of 650 kg/m³ | 0.66 | 0.61 | 0.63 | 0.2 | 0.25 | 0.6 | 0.67 | 0.54 | 0.57 | 0.54 | 0.59 | 0.34 | 0.42 | 0.35 | |
| Perforator formaldehyde mg/100 g | 12.3 | 12.8 | 12.3 | 10.7 | 12 | 12.1 | 10.2 | 10.5 | 12 | 12.1 | 11 | 11.7 | 12 | | |

TABLE 3

| Curing time seconds/mm board thickness | 9 | 10.5 | 12 | 13.5 | 15 |
|---|---|---|---|---|---|
| Catalysts | Tensile (N/mm²) for a density of 650 kg/m³ | | | | |
| Catalyst 1 | 0.37 | 0.56 | 0.58 | 0.62 | 0.69 |
| Catalyst 2 | 0.54 | 0.63 | 0.58 | 0.62 | 0.68 |
| Catalyst 4 | 0.26 | 0.38 | 0.46 | 0.51 | 0.52 |
| Catalysts | Swelling 24 hours cold water: % | | | | |
| Catalyst 1 | 13.6 | 12.6 | 13.2 | 13.6 | 13.5 |
| Catalyst 2 | 16.2 | 12.1 | 12.7 | 12.7 | 12.4 |
| Catalyst 4 | 16.8 | 14.9 | 14.5 | 14.7 | 14.3 |

Example 4

A urea-formaldehyde resin containing 4% of melamine and having a molar ratio F/NH₂ of 0.535 is used.

Hexamethylenetetramine sulphate is prepared using the following reactants:
Aqueous solution of ammonia containing 25.5 mass%.
Aqueous solution of formaldehyde containing 68%
Sulphuric acid containing 96%

The device employed in Example 1 is employed. 356 grams of a 25.5% strength aqueous solution of ammonia (5.34 moles) are introduced into the bottom reactor. 357 grams of a 67.2% strength aqueous solution of form aldehyde (8 moles) are introduced into the top reactor, the temperature of this solution being maintained at 85° C. by circulating hot water through the jacket. The formaldehyde solution is added over 30 minutes, which results in a rise in temperature, which is maintained at 55° C.

At the end of reaction the pH is 10. 680 grams of 96% sulphuric acid are then added over 10 minutes. The pH of the reaction mixture is then 35. The final solution contains 45% of hexamethylenetetramine sulphate.

Various catalyst compositions are produced using different hexamethylenetetramine/formaldehyde/sulphuric acid molar ratios. Into a test tube are introduced 10 grams of urea-formaldehyde resin containing melamine, 15 cm³ of 15% strength solution of ammonium chloride and into other test tubes and different quantities of hexamethylenetetramine sulphate prepared so that the molar quantity of acid should be equivalent to the molar quantity of ammonium chloride. The gel times of the adhesive mixtures, determined at 100° C., are summarized in Table 4. With ammonium chloride the gel time is 130 seconds.

TABLE 4

| HEXAMETHYLENE-TETRAMINE SULPHATE (grams) | SULPHURIC ACID (grams) | CATALYST COMPOSITION - HEXAMETHYLENE-TETRAMINE/H+ MOLAR RATIO | GEL TIME AT 100° C. (seconds) |
|---|---|---|---|
| 0.106 | 0.1099 | 0.2 | 75 |
| 0.212 | 0.0824 | 0.4 | 135 |
| 0.318 | 0.0550 | 0.6 | 245 |
| 0.424 | 0.0275 | 0.8 | 380 |
| 0.530 | 0 | 1 | 580 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for curing an aminoplast resin liquid adhesive in the presence of a curing catalyst, the improvement wherein the curing catalyst is a hexamethylenetetramine salt of a strong acid.

2. A curing process of claim 1, wherein the hexamethylenetetramine salt of a strong acid is used in an amount of 0.1 to 10% by weight based on the weight of the resin solution.

3. A curing process according to claim 1, wherein the hexamethylenetetramine salt of a strong acid is prepared from an aqueous ammonia solution and from an aqueous solution of formaldehyde being employed in a F/NH₃ molar ratio of about 1.5, the formaldehyde solution being added hot to the ammonia solution, and acidified by the addition of a strong acid to produce a final solution with a pH of 1 to 7.

4. A curing process according to claim 3, wherein the pH is 2 to 5.

5. A curing process of claim 1, wherein the hexamethylenetetramine salt of a strong acid is added to the resin at the time of use.

6. A curing process of claim 1, wherein the hexamethylenetetramine is incorporated in the aminoplast resin prior to its application, and the strong acid is added at the time of application.

7. A curing process according to claim 1, wherein the salt of hexamethylenetetramine is added to the aminoplast resin prior to application, and an additional quantity of a strong acid or of hexamethylenetetramine is added so as to exceed the stoichiometric quantities of strong acid or of hexamethylenetetramine.

8. A process according to claim 1, wherein the strong acid is hydrochloric or sulfuric acid.

9. In a process for the production of particle board or plywood, comprising coating particles or boards with aminoplast resin adhesive and thermally compressing the coated particles or boards in the presence of a curing catalyst to cure the adhesive, the improvement comprising employing in the curing catalyst a hexamethylenetetramine salt of a strong acid.

10. A process according to claim 9, wherein the hexamethylenetetramine salt of a strong acid is used in an amount of 0.1–10% by weight based on the weight of the resin solution.

11. A process according to claim 9, wherein the hexamethylenetetramine salt of a strong acid is prepared from an aqueous ammonia solution and from an aqueous solution of formaldehyde being employed in a F/NH$_3$ ratio of about 1.5, the formaldehyde solution being added hot to the ammonia solution, and acidified by the addition of a strong acid to produce a final solution with a pH of 1–7.

12. A process according to claim 11, wherein the pH is 2–5.

13. A process according to claim 9, wherein the hexamethylenetetramine salt of a strong acid is added to the resin at the time of use.

14. A process according to claim 9, wherein the hexamethylenetetramine is incorporated in the aminoplast resin prior to the coating step, and the strong acid is added at the time of the coating step.

15. A process according to claim 9, wherein the salt of hexamethylenetetramine is added to the aminoplast resin prior to the coating step, and an additional quantity of a strong acid or of hexamethylenetetramine is added so as to exceed the stoichiometric quantities of strong acid or hexamethylenetetramine.

16. A process according to claim 9, wherein the strong acid is hydrochloric or sulfuric acid.

17. A process according to claim 9 for the production of particle board.

18. A process according to claim 16 for the production of particle board.

19. A composition comprising an aminoplast liquid adhesive containing as a curing catalyst a hexamethylenetetramine salt of a strong acid.

20. A composition according to claim 19, wherein the strong acid is hydrochloric acid or sulfuric acid.

* * * * *